(12) United States Patent
Olsen et al.

(10) Patent No.: US 10,635,984 B2
(45) Date of Patent: Apr. 28, 2020

(54) SYSTEM AND METHOD FOR THE ASSESSMENT OF CONDITION IN COMPLEX OPERATIONAL SYSTEMS BASED ON MULTI-LEVEL PATTERN RECOGNITION

(71) Applicant: Falkonry Inc., Sunnyvale, CA (US)

(72) Inventors: Gregory Olsen, Menlo Park, CA (US); Nikunj Mehta, Cupertino, CA (US); Lenin Kumar Subramanian, Half Moon Bay, CA (US); Dan Kearns, Half Moon Bay, CA (US)

(73) Assignee: FALKONRY INC., Sunnyvale, CA (US)

( * ) Notice: Subject to any disclaimer, the term of this patent is extended or adjusted under 35 U.S.C. 154(b) by 108 days.

(21) Appl. No.: 16/042,881

(22) Filed: Jul. 23, 2018

(65) Prior Publication Data

US 2020/0027011 A1    Jan. 23, 2020

(51) Int. Cl.
*G06N 5/04* (2006.01)
*G06N 20/00* (2019.01)

(52) U.S. Cl.
CPC .............. *G06N 5/047* (2013.01); *G06N 20/00* (2019.01)

(58) Field of Classification Search
None
See application file for complete search history.

(56) References Cited

U.S. PATENT DOCUMENTS

| 5,440,661 | A  | * | 8/1995 | Papcun | G10L 15/16 704/232 |
| 10,037,128 | B2 | * | 7/2018 | Mehta | G06F 3/0484 |
| 10,176,246 | B2 | * | 1/2019 | Dang | G06F 17/18 |
| 10,409,926 | B2 | * | 9/2019 | Mehta | G05B 23/0227 |
| 2002/0023116 | A1 | * | 2/2002 | Kikuchi | G06F 17/147 708/402 |
| 2007/0292002 | A1 |   | 12/2007 | Kaplan | |
| 2011/0188583 | A1 | * | 8/2011 | Toraichi | G06T 5/002 375/240.27 |
| 2012/0198420 | A1 | * | 8/2012 | Pein | G06Q 10/04 717/124 |
| 2017/0017901 | A1 | * | 1/2017 | Firooz | G06N 5/003 |
| 2017/0316067 | A1 |   | 11/2017 | Subramanian et al. | |

OTHER PUBLICATIONS

The International Searching Authority, "Search Report" in application No. PCT/US2019/034628, dated Aug. 1, 2019, 12 pages.
Current Claims in application No. PCT/US2019/034628, dated Aug. 2019, 2 pages.

* cited by examiner

*Primary Examiner* — Paulinho E Smith
(74) *Attorney, Agent, or Firm* — Hickman Palermo Becker Bingham LLP (57) ABSTRACT

A system and method to identify patterns in sets of signals produced during operation of a complex system and combines the identified patterns with records of past conditions to generate operational feedback to one or more machines of the complex system while it operates.

11 Claims, 9 Drawing Sheets

SYSTEM AND METHOD FOR THE ASSESSMENT OF CONDITION IN COMPLEX OPERATIONAL SYSTEMS BASED ON MULTI-LEVEL PATTERN RECOGNITION

BACKGROUND

Complex operational systems are subject to unexpected changes in condition over time. As a side effect of their operation, these systems produce multiple signals that can be captured. These signals may include currents, temperatures, positions, forces, material properties, etc. Patterns present in these signals may be used to understand the current or future condition of a complex operational system as it is operating. For example, a stamping machine that produces steel parts will periodically enter a condition in which maintenance is required. During operation, measurements of currents, forces, and temperatures are captured, and can be used to identify the onset of a maintenance-needed condition.

BRIEF SUMMARY

A system and method are disclosed to recognize operational conditions in diverse and complex machine systems from available signal data. Typical examples of these complex machine systems include batch-oriented machine systems and continuously running machine systems/processes. To accomplish the condition recognition for either batch or continuous machine systems, the system learns features from the raw signal data. These features may then be utilized to classify the condition of the machine system in question. The system includes multi-level feature learning and classification for any kind of systems. The system further analyzes how the state of the system evolves over time.

The invention may be utilized as a component of a complex machine system, for example for manufacturing or product testing, to improve the efficiency and accuracy of the complex machine system in operation. In this regard, the invention may be utilized as a component of an open loop or closed loop feedback mechanism in such systems, identifying and alerting as to aberrational behavior of specific stations in the complex system, and thus directing personnel to the remediation of the condition, or triggering automatic remediation measures. In some cases, the invention may assert control signals to the aberrational components to automatically 'close the loop' and remediate their behavior. In addition to use with complex machine systems, the invention may also be useful in exercise and fitness monitors, among other things.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Various terminology is utilized herein and should be accorded its ordinary meaning in the arts unless otherwise indicated expressly or by context.

"Digest" refers to a set of values used to represent signal behavior for a trailing period of time.

"Condition" refers to the state or status of the machine as it evolves over time.

"Block" refers to logic having a boundary defining the contents of the block, such that the contents may be manipulated (e.g., communicated, copied, organized) as a unit. Examples of blocks are files, classes, tables, databases, and data structures.

The system disclosed herein learns patterns in the sets of signals produced during operation of a complex system and combines learned patterns with records of past conditions (known condition episodes) to learn how to recognize the condition of the machine while it operates over time. For example, as a station in a complex system is utilized to produce a part, it repetitively executes a particular operation. During each stage, various quantities such as currents or forces are measured and captured in the form of a time varying signal. Over time, the operating condition of the station may degrade or change in unexpected ways, leading to necessity for a maintenance intervention to prevent downtime or other loss. Knowledge of the operating condition on a continuous basis enhances the ability of the operators of the machine to achieve performance goals. The system disclosed herein identifies patterns in the sets of signals produced during operation of a complex system and combines the identified patterns with records of past conditions to:

1. Predict the condition of the complex system while it operates; and/or
2. Predict a quality outcome of a product produced by the system;

In general, operation of a machine produces N time series signal traces. Each trace represents the capture of a sequence of measurements for that signal over time. Measurements can be captured at different and irregular intervals across the signals. In addition to signal data, operational data systems can capture maintenance events, quality measures, and performance metrics that can characterize periods of known condition for the machine.

Figure 1:
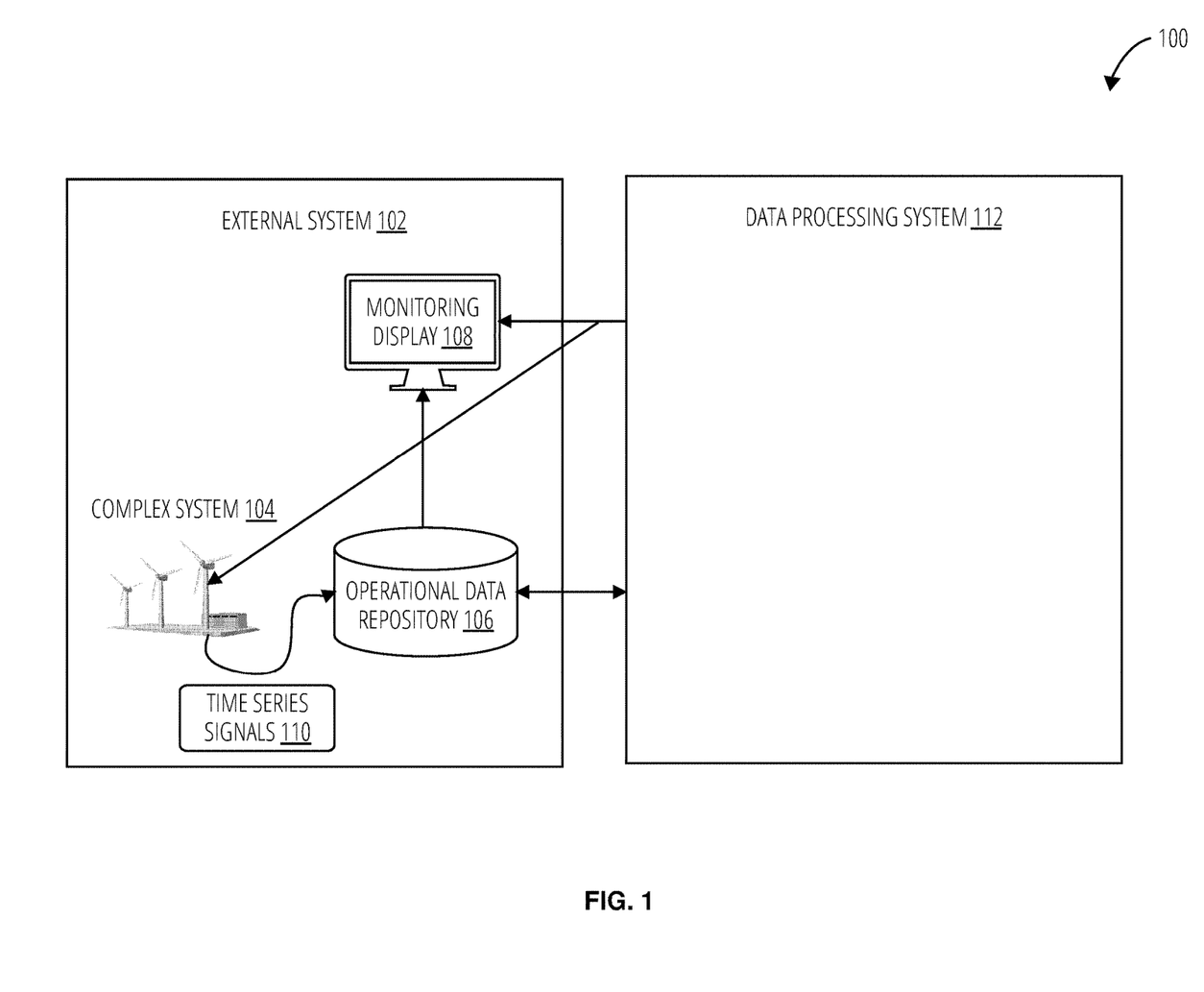
FIG. 1 illustrates an embodiment of a signal classification and explanation system 100.

Referring to FIG. 1, an example of a signal classification and explanation system 100 comprises an external system 102 and a data processing system 112. The external system 102 further comprises a complex system 104, an operational data repository 106, and a monitoring display 108.

The complex system 104 may be communicatively coupled to the operational data repository 106 for sending a data stream of time series signals 110 from multiple sensors attached to the complex system 104. The time series signals 110 may represent multiple data observations collected by the multiple sensors. The purpose of the multiple sensors on the complex system 104 is to take measurements at various points within the complex system 104.

One example of the complex system 104 is a power plant made up of multiple wind turbines that generate energy from the wind, in which case the multiple sensors may include: sensors that measure the rotational speed, sensors that measure vibration at various locations, sensors that measure currents and power for each turbine. In another example, the complex system 104 may represent a repetitive operation fabrication machine. For each operation multiple sensors capture measurements over time that may include force measurements, position measurements, and current measurements. The particular application may include one or more computer classes that generate output, such as log output, for the particular computer application. The log output generating classes may be considered built-in instrumentation that reports the current state of multiple classes and objects invoked within the particular computer application.

In an embodiment, the operational data repository 106 may represent a server computer that is configured or programmed to collect the time series signals 110 produced by the multiple sensors on the complex system 104, store the time series signals 110 based on the signal data type, and perform various types of signal processing on the time series signals 110, using one or more stored program that the server computer executes. The operational data repository 106 may also be capable of sending either real-time data or stored data to the monitoring display 108 for the purposes of presenting signal data values to a user for monitoring purposes. The operational data repository 106 may also aggregate the signal data to create aggregated statistics showing changes in signal values over periods of time. Embodiments of the operational data repository 106 features are not limited to the features described above. The operational data repository 106 may be implemented using any commercially available monitoring programs and may utilize any monitoring features within the commercially available products.

The monitoring display 108 may be a computer-implemented machine programmed to display the signal data received from the operational data repository 106. The monitoring display 108 may be capable of directly receiving data input from signal data processing system 110.

The data processing system 112 may be configured to receive a data stream of signal data from the operational data repository 106 and identify physical conditions related to the signal data received. The data processing system 112 may be further configured to send the identified physical conditions to the external system 102, either by sending data back to the operational data repository 106 or by sending data directly to the monitoring display 108 so that a user can better identify conditions related to the incoming signal data.

Figure 2:
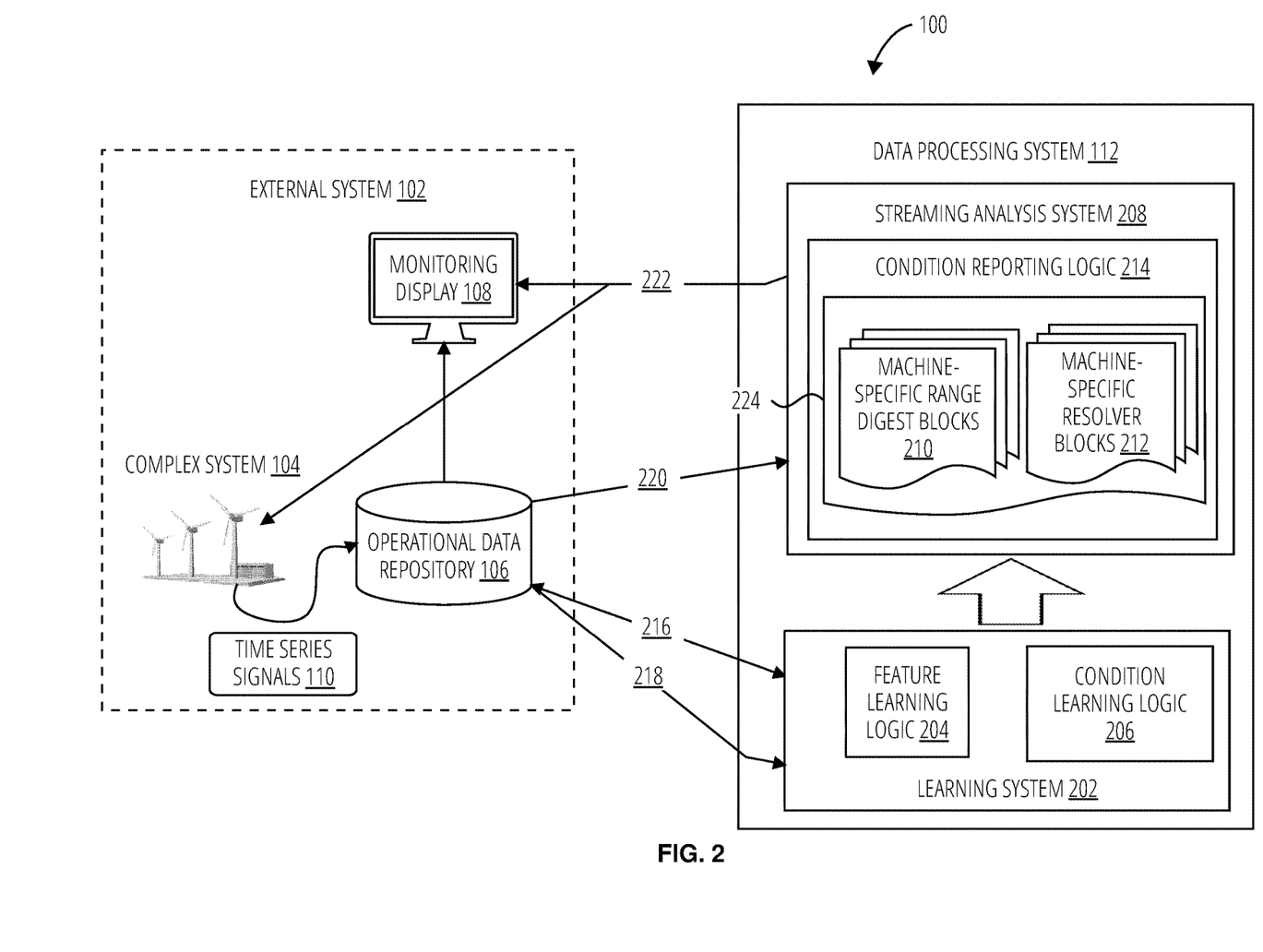
FIG. 2 illustrates more details of the signal classification and explanation system 100 in accordance with one embodiment.
Figure 3:
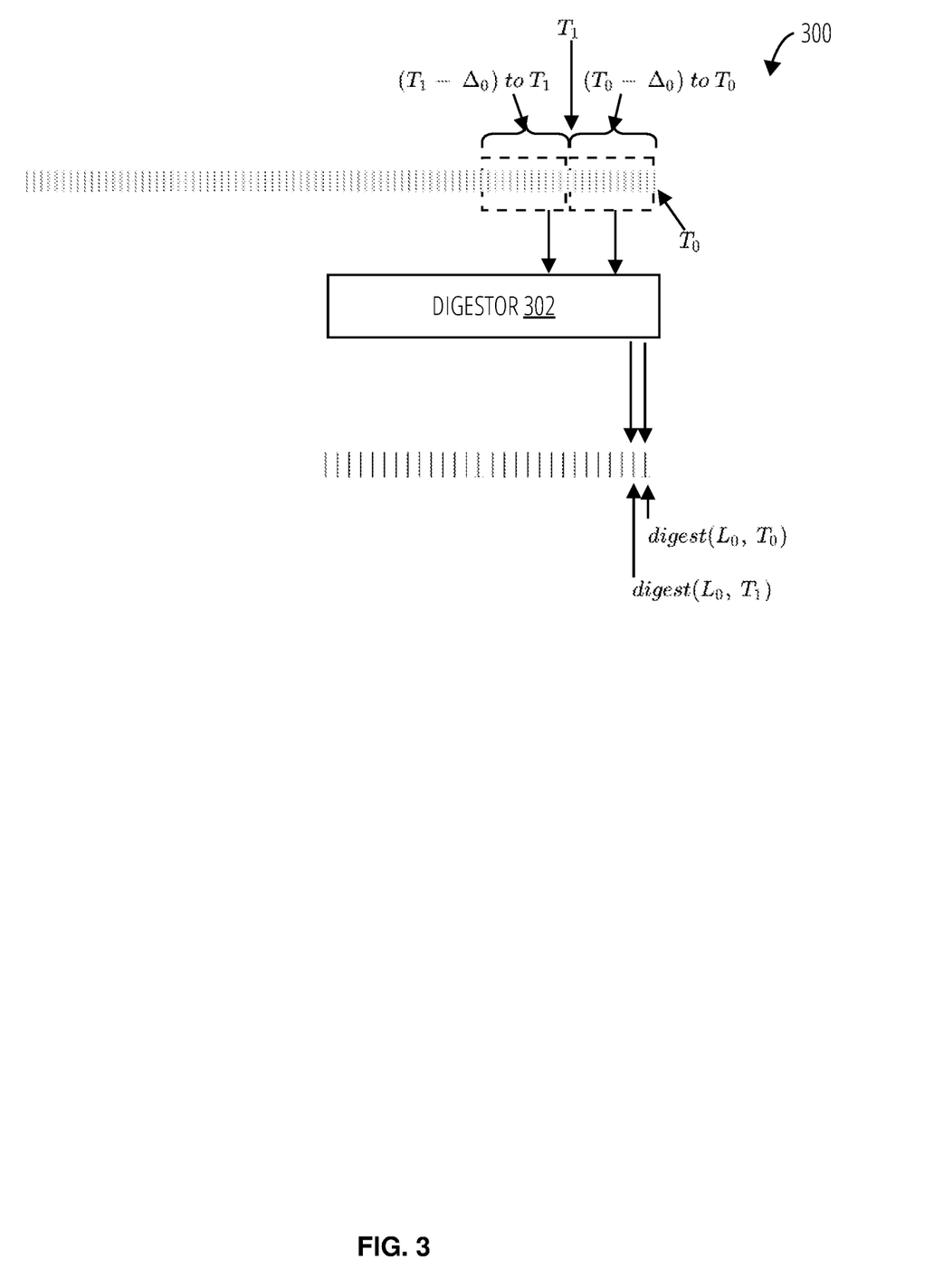
FIG. 3 illustrates a digest generation process 300 in accordance with one embodiment.
Figure 4:
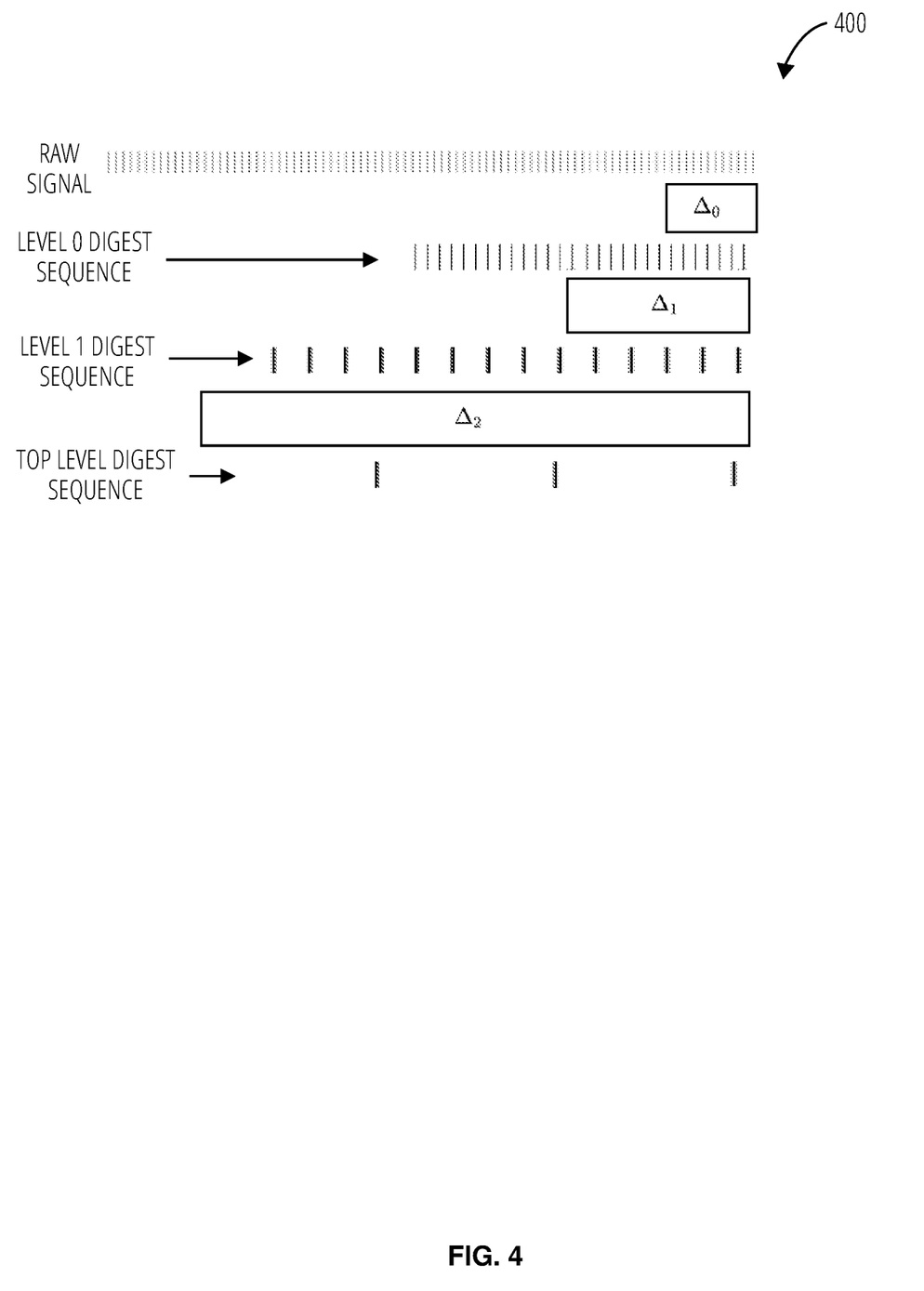
FIG. 4 illustrates a multi-level range digestion process 400 in accordance with one embodiment.
Figure 5:
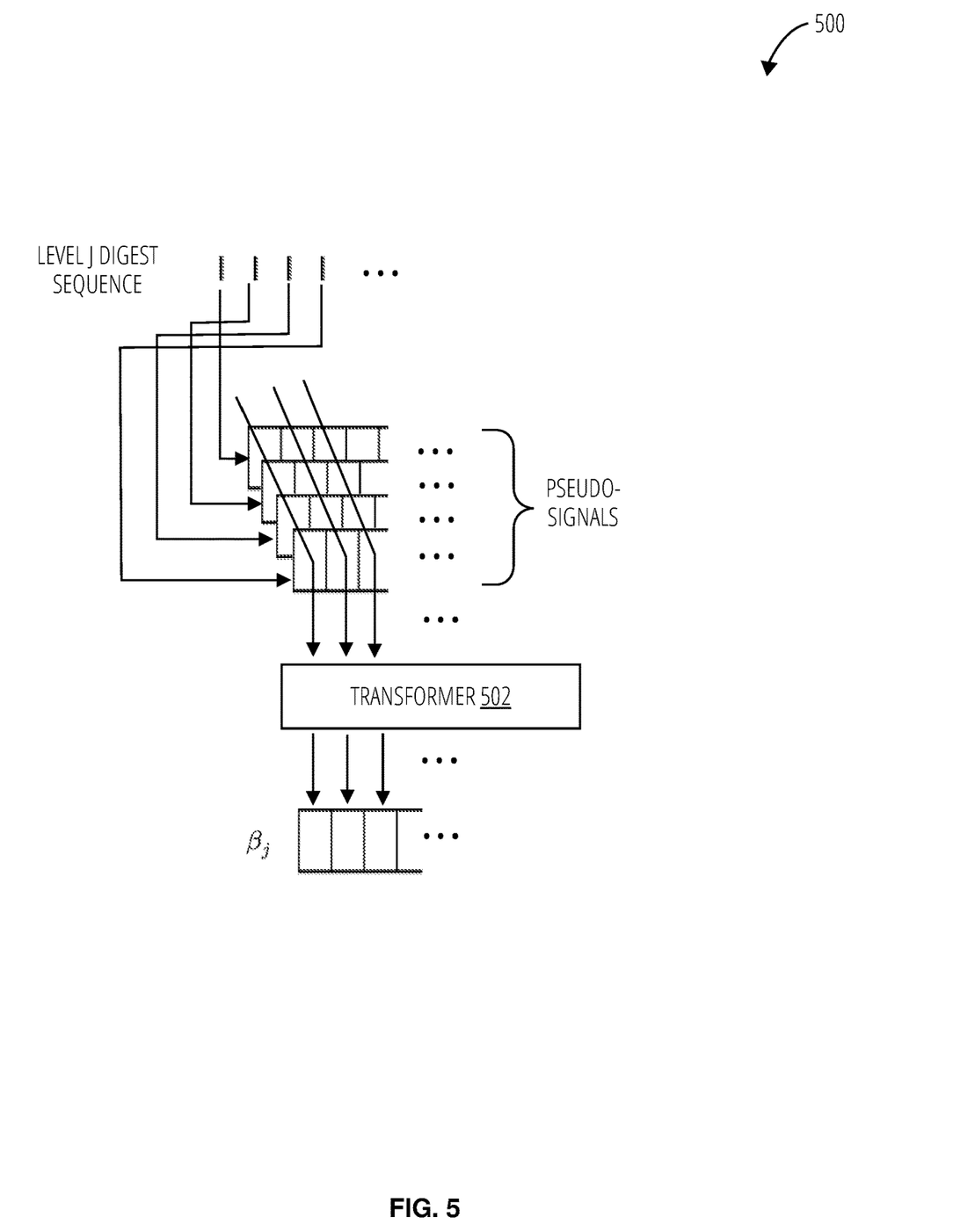
FIG. 5 illustrates a pseudo-signal transformation process 500 in accordance with one embodiment.
Figure 6:
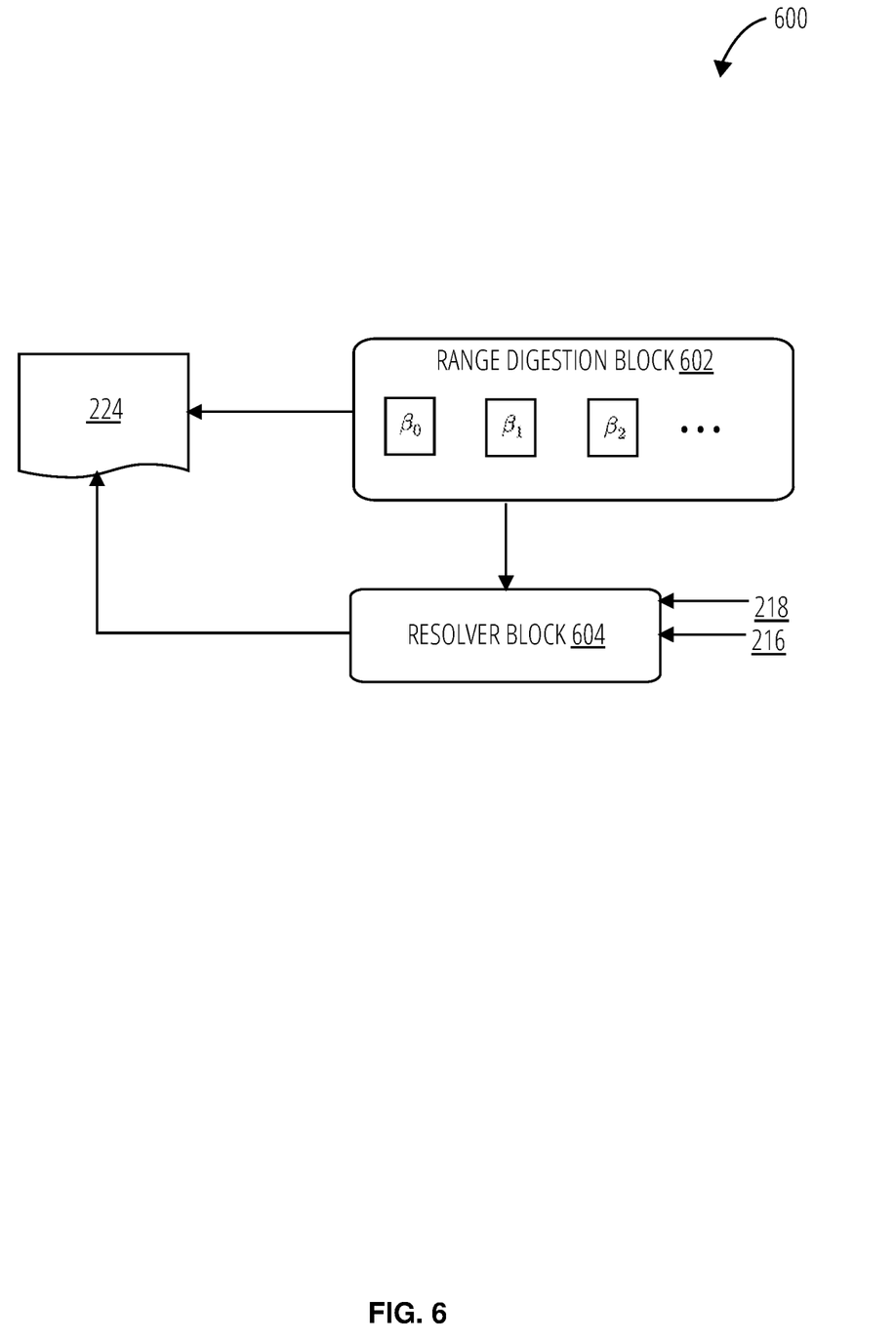
FIG. 6 illustrates a process 600 for forming a condition recognition block 224 in accordance with one embodiment.

FIG. 2 illustrates additional aspects of the data processing system 112 in one embodiment. The data processing system 112 comprises a learning system 202 and a streaming analysis system 208. The learning system 202 includes feature learning logic 204 and condition learning logic 206. The streaming analysis system 208 includes machine-specific range digest blocks 210 and machine-specific resolver blocks 212. The learning system 202 learns to recognize conditions for a particular machine from a historical time range for N signals 216 and known condition episodes 218 of the particular machine. The recognized conditions are output to the condition reporting logic 214 of the streaming analysis system 208 as a condition recognition block 224. During operation, N signal streams 220 for the particular machine are input to the streaming analysis system 208, which applies one of the appropriate machine-specific range digest blocks 210 and machine-specific resolver blocks 212 to determine a streaming condition assessment 222 from the N signal streams 220 and the condition recognition block 224 for the particular machine. The streaming condition assessment 222 is applied to operational, recording, and/or display systems.

Referring now to FIG. 3-FIG. 8, the condition recognition block 224 is created by the learning system 202 and is comprised of a range digestion block 602 that transforms incoming signal data in a time range [(t−delta) to t] into a range digest for time t, and a resolver block 604 that transforms a range digest for time t into a condition value for time $t_o$ where $t_o >= t$.

Figure 7:
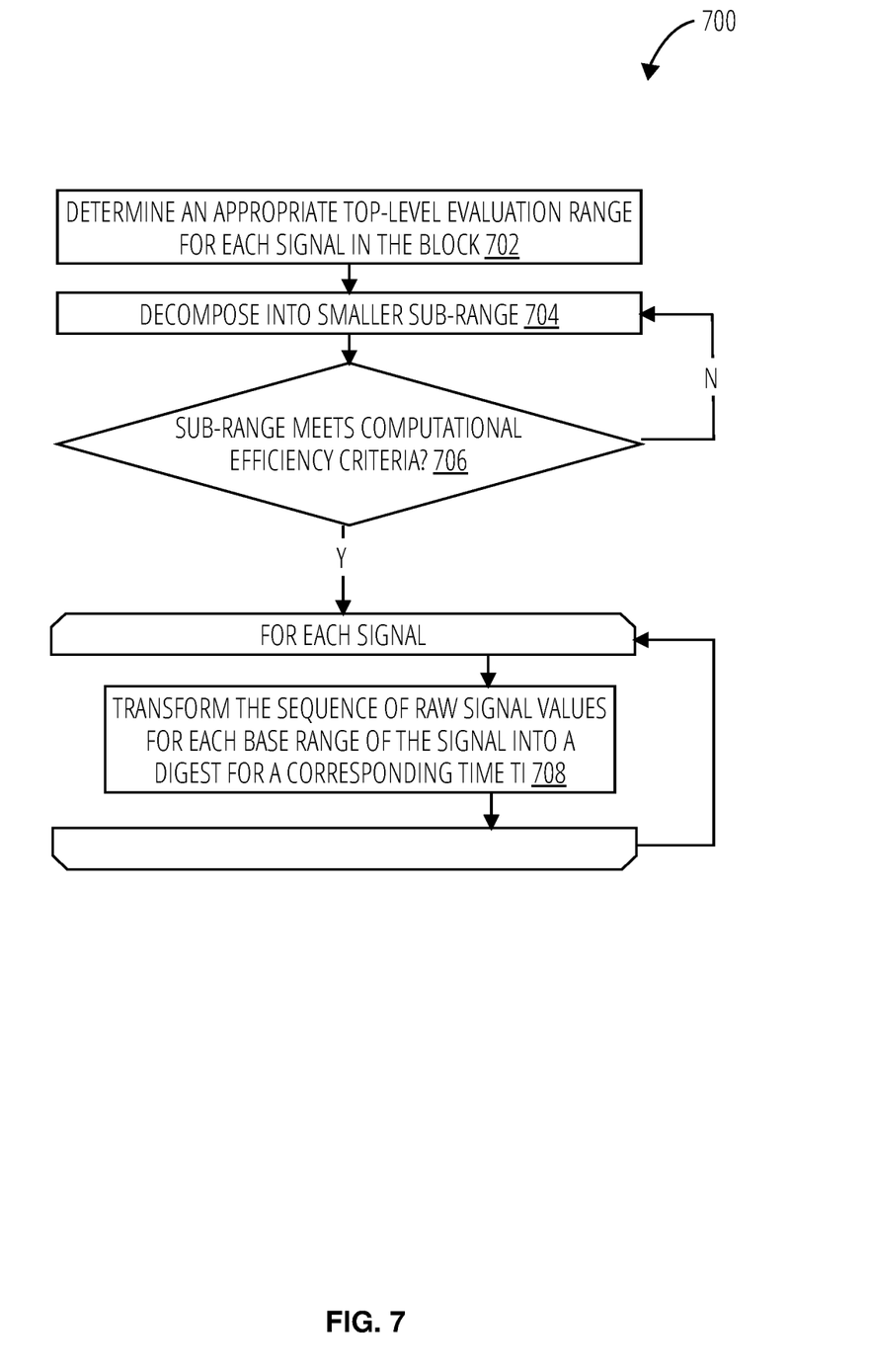
FIG. 7 illustrates a digest generation process 700 in accordance with one embodiment.

The feature learning logic 204 of the learning system 202 uses a multilevel algorithm to create the range digestion block 602 that transforms the historical time range for N signals 216 for a particular machine X for a trailing range [(t−delta) to t] into a time range digest for time t. The multilevel approach described below entails determination of an appropriate value of delta, followed by the hierarchical decomposition of the range [(t−delta) to t] into sub-ranges, followed by a hierarchical composition of transformations from the smallest sub-ranges to the largest. Referring to FIG. 7, a digest generation process 700 performs the following actions to create the range digestion block 602:

1. Determine an appropriate top-level evaluation range (top level delta) for each signal (block 702). This range captures a pragmatic period of trailing history that can accurately characterize the behavior of the historical time range for N signals 216 over time. The range is determined through signal-by-signal analysis of the provided historical time range for N signals 216 using numerical optimization techniques such as entropy minimization in combination with user provided hints (such as upper and lower bounds on time ranges or on the number of repetitive operations that a machine may execute).

2. Hierarchically decompose the chosen top-level range for each signal into n−1 progressively smaller sub-ranges (intermediate delta values, block 704) until one of the sub-ranges (the "base range", herein $delta_0$) meets computational efficiency criteria (decision block 706) that are based on the number of signals, sample rates per signal, and available computational resources. Sub-ranges are determined through numerical optimization techniques such as entropy minimization in combination with user provided hints (such as upper and lower bounds on time ranges or on the number of repetitive operations that a machine may execute).

3. For each signal, step the base range window across the signal, and for each step of the base range window, apply a range digestor 302 to generate a transformation (block 708) that maps the sequence of raw signal values in the base range window $[t_i-delta_0$ to $t_i]$ into a digest for the signal at time $t_i$. This process is illustrated by the digest generation process 300 is FIG. 3 for level 0. If there are M base ranges in the top-level range for a particular signal, this will generate $M_0$ level 0 digests for the signal. The transformation can be generated by a variety of techniques including independent component analysis (ICA) or long short-term memory (LSTM) recurrent neural networks using the provided historical range of data for each signal to train a transformation.

In one embodiment, the delta size to use at each level of the range digestion process is changed between levels on a logarithmic scale and is not a linear change. Also, in one embodiment, the same delta is used for each signal at a given level. Other embodiments dynamically determine the delta at each level based on specific characteristics of the particular signal being digested.

Figure 8:
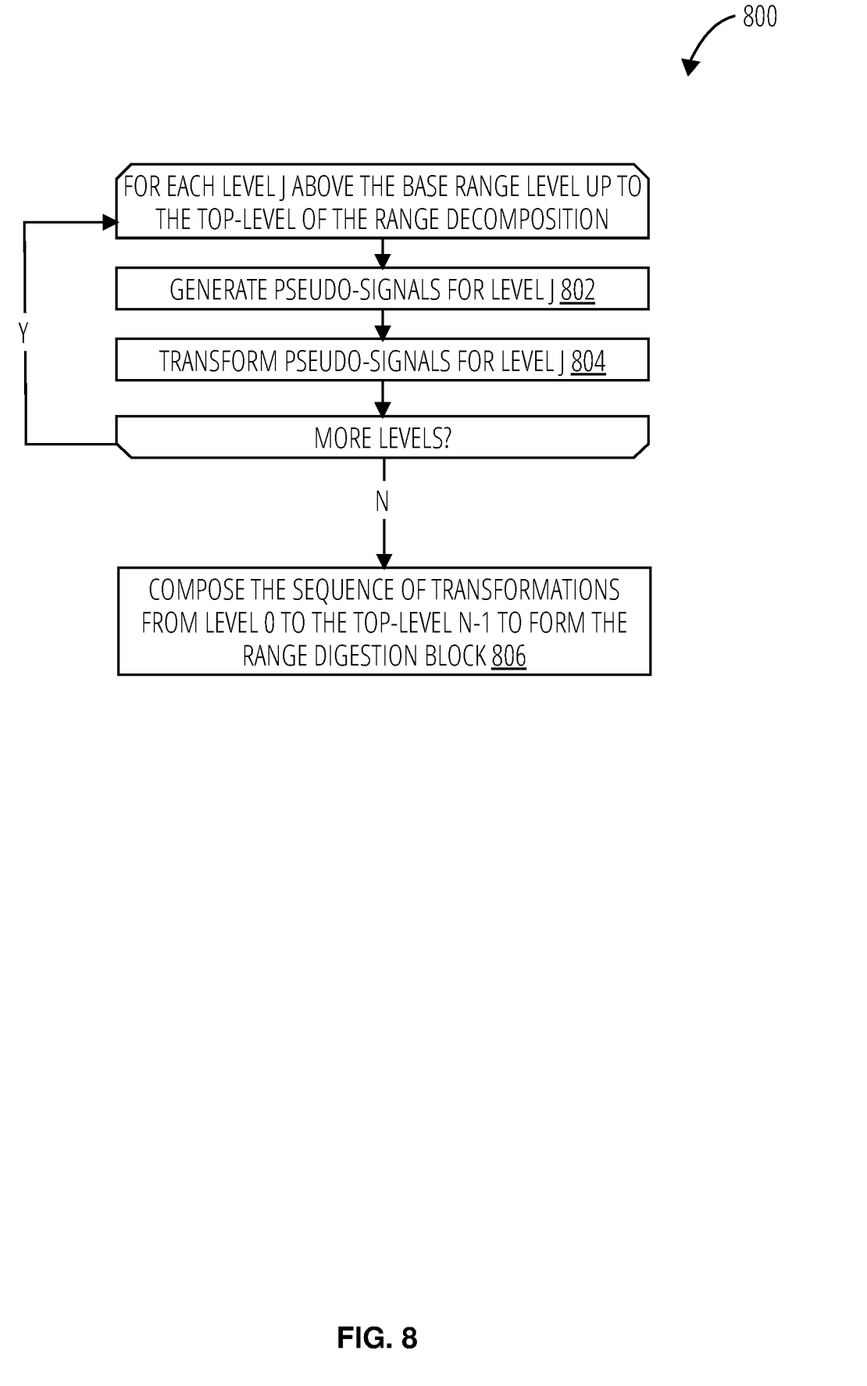
FIG. 8 illustrates a range digestion block generation process 800 in accordance with one embodiment.

Referring now to FIG. 8, a range digestion block generation process 800 then performs the following actions to complete the generation of the range digestion block 602:

1. For each level j of the n−1 levels of range decomposition of a signal above the base range level:

a. The range digestion is applied (block 802) sequentially to the historical signal time series signal data over i windows each having a range $[t_i-\text{delta}_j$ to $t_i]$, i=0 to $M_j-1$, where $\text{delta}_j$ is the delta to use for level j of the decomposition. See the multi-level range digestion process 400 in FIG. 4. This forms a sequence of $M_j$ of range digests for each signal at level j, one for each time $t_i$ corresponding to a range of $\text{delta}_j$ raw data signals. These $M_j$ range digests are referred to herein as the set of pseudo-signals for level j. Note that the value of Mj varies from level to level.

b. A transformer 502 is applied on the $M_j$ range digests of level j using each of the pseudo-signals (block 804) for level j (see the pseudo-signal transformation process 500 in FIG. 5). This transformation generates the range transformation block $\beta_j$ for level j. The transformer 502 can utilize a variety of techniques including independent component analysis (ICA) or long short-term memory (LSTM) using the provided historical range of data to train the transformer 502.

2. The composed sequence of range transformation blocks $\beta_j$ for level 0 to the top-level n−1 (see the process 600 in FIG. 6) for each signal is the range digestion block 602 (block 806). This block maps a time range $[t-\text{delta}_{n-1}$ to $t]$ of the historical time range for N signals 216 to a combined digest for the signals at time t.

Next the resolver block 604 is generated and added to the condition recognition block 224 by applying the range digestion block 602 to the supplied historical time range for N signals 216, and the known condition episodes 218 for the historical time range. The streaming analysis system 208 uses a combination of unsupervised and supervised learning techniques including clustering, random forest, and nearest neighbors to transform the condition recognition block 224 into a streaming condition assessment 222 for the machine. This streaming condition assessment 222 will be one of the following:

a. One of the known condition labels among the set of provided episodes.

b. An auto-generated "unlabledX" label that denotes a discovered condition for which no known condition episodes were provided.

c. The "unknown" condition that denotes a condition not seen previously or an anomaly.

The system then assembles the condition recognition block 224 by composing the range digestion block 602 and the resolver block 604 in series. This results in a transformation in a range of time for the N signals into a sequence of condition values.

Figure 9:
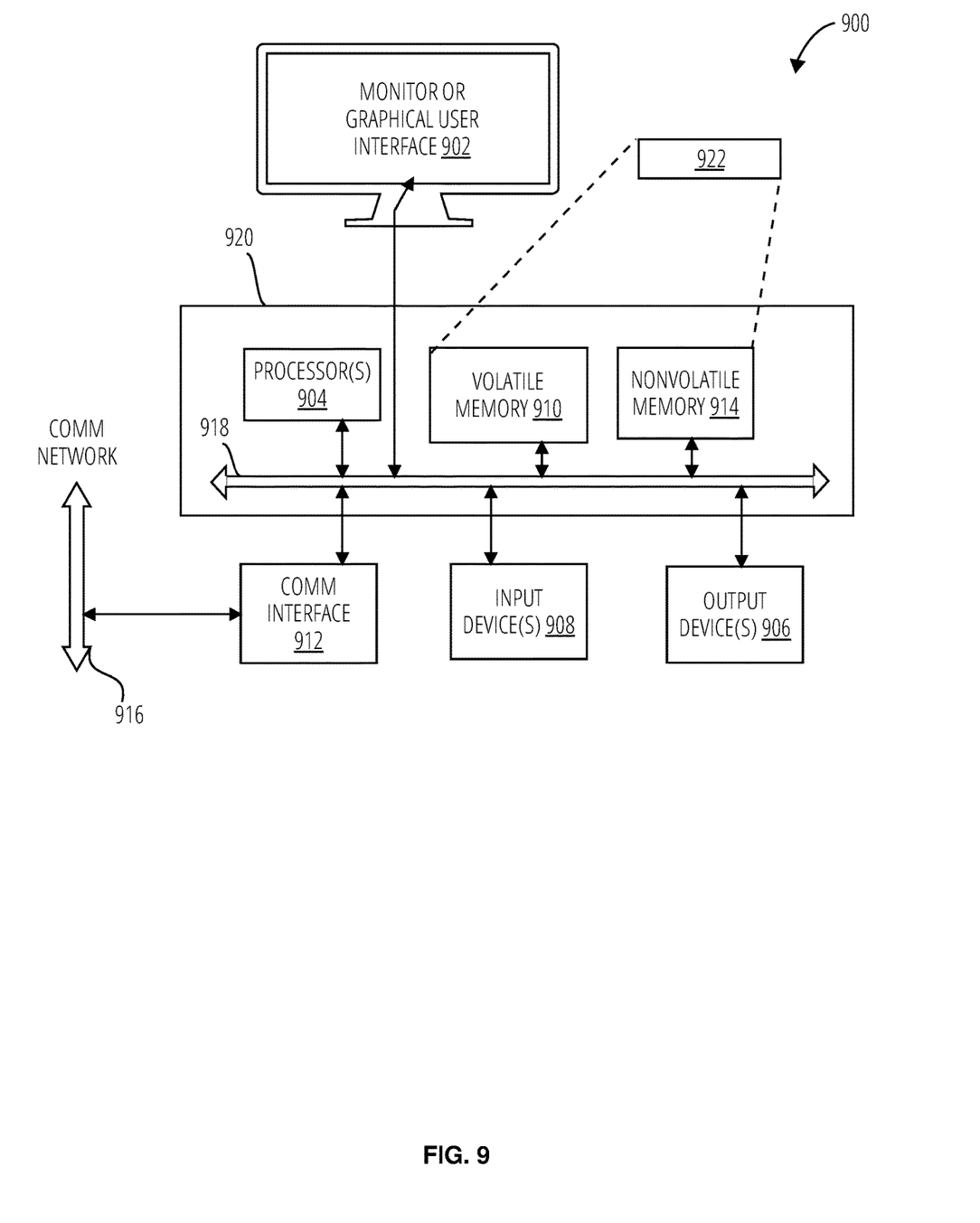
FIG. 9 is an example block diagram of a computing device 900 that may incorporate embodiments of the present invention.

FIG. 9 is an example block diagram of a computing device 900 that may incorporate embodiments of the present invention. FIG. 9 is merely illustrative of a machine system (e.g., data processing system 112) to carry out aspects of the technical processes described herein, and does not limit the scope of the claims. One of ordinary skill in the art would recognize other variations, modifications, and alternatives. In one embodiment, the computing device 900 typically includes a monitor or graphical user interface 902, a data processing system 920, a communication network interface 912, input device(s) 908, output device(s) 906, and the like.

As depicted in FIG. 9, the data processing system 920 may include one or more processor(s) 904 that communicate with a number of peripheral devices via a bus subsystem 918. These peripheral devices may include input device(s) 908, output device(s) 906, communication network interface 912, and a storage subsystem, such as a volatile memory 910 and a nonvolatile memory 914.

The volatile memory 910 and/or the nonvolatile memory 914 may store computer-executable instructions and thus forming logic 922 that when applied to and executed by the processor(s) 904 implement embodiments of the analytical and control processes disclosed herein.

The input device(s) 908 include devices and mechanisms for inputting information to the data processing system 920. These may include a keyboard, a keypad, a touch screen incorporated into the monitor or graphical user interface 902, audio input devices such as voice recognition systems, microphones, and other types of input devices. In various embodiments, the input device(s) 908 may be embodied as a computer mouse, a trackball, a track pad, a joystick, wireless remote, drawing tablet, voice command system, eye tracking system, and the like. The input device(s) 908 typically allow a user to select objects, icons, control areas, text and the like that appear on the monitor or graphical user interface 902 via a command such as a click of a button or the like.

The output device(s) 906 include devices and mechanisms for outputting information from the data processing system 920. These may include the monitor or graphical user interface 902, speakers, printers, infrared LEDs, and so on as well understood in the art.

The communication network interface 912 provides an interface to communication networks (e.g., communication network 916) and devices external to the data processing system 920. The communication network interface 912 may serve as an interface for receiving data from and transmitting data to other systems. Embodiments of the communication network interface 912 may include an Ethernet interface, a modem (telephone, satellite, cable, ISDN), (asynchronous) digital subscriber line (DSL), FireWire, USB, a wireless communication interface such as Bluetooth or WiFi, a near field communication wireless interface, a cellular interface, and the like.

The communication network interface 912 may be coupled to the communication network 916 via an antenna, a cable, or the like. In some embodiments, the communication network interface 912 may be physically integrated on a circuit board of the data processing system 920, or in some cases may be implemented in software or firmware, such as "soft modems", or the like.

The computing device 900 may include logic that enables communications over a network using protocols such as HTTP, TCP/IP, RTP/RTSP, IPX, UDP and the like.

The volatile memory 910 and the nonvolatile memory 914 are examples of tangible media configured to store computer readable data and instructions to implement various embodiments of the processes described herein. Other types of tangible media include removable memory (e.g., pluggable USB memory devices, mobile device SIM cards), optical storage media such as CD-ROMS, DVDs, semiconductor memories such as flash memories, non-transitory read-only-memories (ROMS), battery-backed volatile memories, networked storage devices, and the like. The volatile memory 910 and the nonvolatile memory 914 may be configured to store the basic programming and data constructs that provide the functionality of the disclosed processes and other embodiments thereof that fall within the scope of the present invention.

Logic 922 that implements embodiments of the present invention may be implemented by the volatile memory 910 and/or the nonvolatile memory 914. Said logic 922 may be applied from the volatile memory 910 and/or nonvolatile memory 914 and executed by the processor(s) 904. The volatile memory 910 and the nonvolatile memory 914 may also provide a repository for storing data used by the logic 922.

The volatile memory 910 and the nonvolatile memory 914 may include a number of memories including a main random access memory (RAM) for storage of instructions and data during program execution and a read only memory (ROM) in which read-only non-transitory instructions are stored. The volatile memory 910 and the nonvolatile memory 914 may include a file storage subsystem providing persistent (non-volatile) storage for program and data files. The volatile memory 910 and the nonvolatile memory 914 may include removable storage systems, such as removable flash memory.

The bus subsystem 918 provides a mechanism for enabling the various components and subsystems of data processing system 920 communicate with each other as intended. Although the communication network interface 912 is depicted schematically as a single bus, some embodiments of the bus subsystem 918 may utilize multiple distinct busses.

It will be readily apparent to one of ordinary skill in the art that the computing device 900 may be a device such as a smartphone, a desktop computer, a laptop computer, a rack-mounted computer system, a computer server, or a tablet computer device. As commonly known in the art, the computing device 900 may be implemented as a collection of multiple networked computing devices. Further, the computing device 900 will typically include operating system logic (not illustrated) the types and nature of which are well known in the art.

Terminology and Interpretation

Terms used herein should be accorded their ordinary meaning in the relevant arts, or the meaning indicated by their use in context, but if an express definition is provided, that meaning controls.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non-transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Software" in this context refers to logic implemented as processor-executable instructions in a machine memory (e.g. read/write volatile or nonvolatile memory or media).

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

What is claimed is:

1. A method comprising:
   receiving a plurality of time series signals generated by a plurality of sensors of one or more machines;
   for each signal of the plurality of time series signals:
     identifying a base range transformation window for the signal through an iterative process of range reduction, each iteration corresponding to a level and a level range;
     for each level:
       transforming the signal into a plurality of digests using the corresponding level range; and
       inputting the digests for each level as pseudo time-series signals to a transformer to generate a transformation block for the level;
   composing the transformation blocks for the levels in a range digestion block;
   generating a resolver block from the range digestion block and known condition episodes;
   composing a condition recognition block from the range digestion block and the resolver block; and
   applying a combination of unsupervised and supervised learning to transform the condition recognition block into a feedback signal applied to the one or more machines.

2. The method of claim 1, the feedback signal comprising one of the following:
   a label of one of the known condition episodes;
   an auto-generated label that denotes a discovered condition not matching one of the known condition episodes; and
   an unknown condition denoting a condition not encountered previously, or an anomaly.

3. The method of claim 1, wherein the condition recognition block is composed by arranging the range digestion block and the resolver block in series.

4. The method of claim 1, wherein the combination of unsupervised and supervised learning techniques comprises clustering, random forest, and nearest-neighbors transformations.

5. The method of claim 1, wherein the transformer utilizes one or more of independent component analysis (ICA) and long short-term memory (LSTM).

6. The method of claim 1, wherein the level range to utilize to generate the plurality of digests at each level is varied between levels on a logarithmic scale.

7. The method of claim 1, wherein the same set of level ranges is used for each signal.

8. The method of claim 1, wherein the set of level ranges is dynamically determined for each signal based on specific characteristics of the signal being digested.

9. The method of claim 1, wherein identifying the base range transformation window for the signal through an iterative process of range reduction comprises decomposing a selected top-range value into sub-ranges, until one of the sub-ranges meets computational efficiency criteria.

10. The method of claim 9, wherein the computational efficiency criteria are based on a number of signals, sample rates per signal, and available computational resources.

11. The method of claim 9, wherein the sub-ranges are determined through numerical optimization techniques such as entropy minimization in combination with user provided hints.

* * * * *